March 9, 1965 O. MULLER-GIRARD 3,173,003
FLUID FLOW MEASURING AND COMPUTING APPARATUS
Filed April 29, 1960 2 Sheets-Sheet 1

INVENTOR.
Otto Muller-Girard
BY P. J. Young, Jr.

March 9, 1965　　　O. MULLER-GIRARD　　　3,173,003
FLUID FLOW MEASURING AND COMPUTING APPARATUS
Filed April 29, 1960　　　　　　　　　2 Sheets-Sheet 2
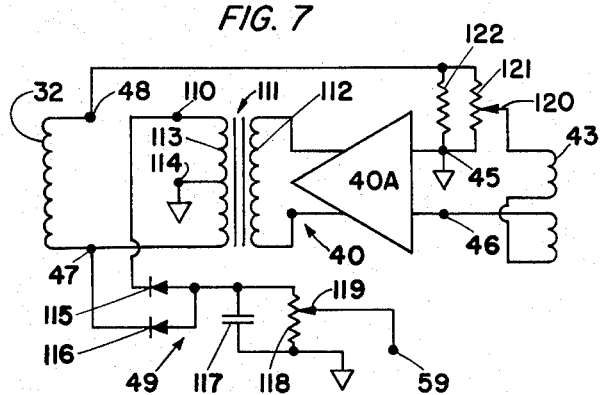
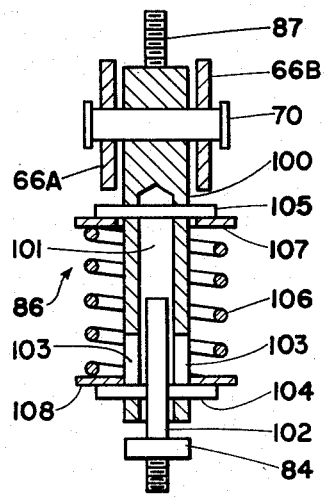
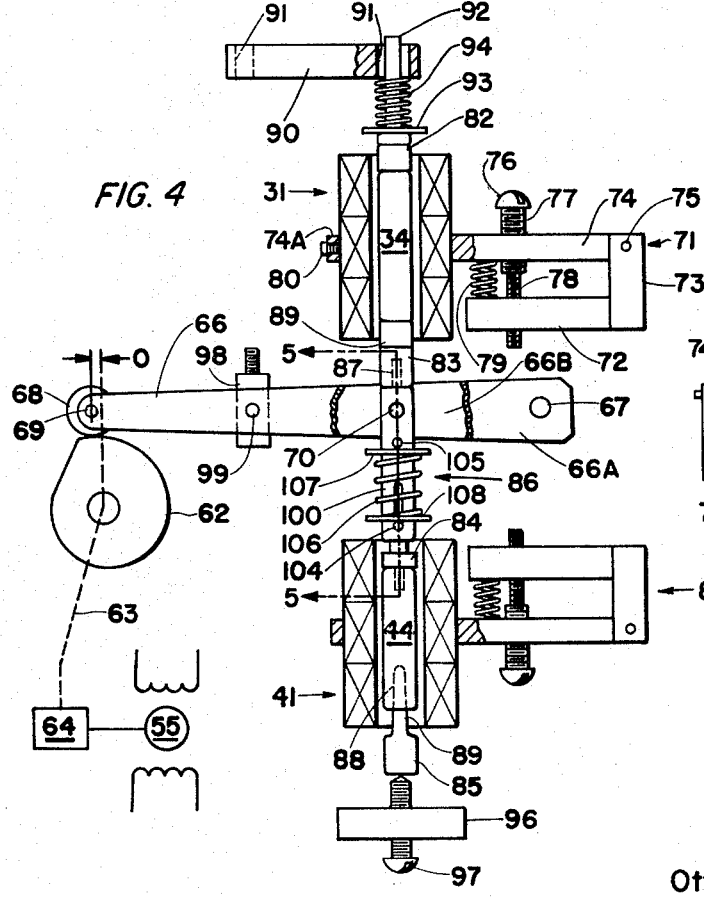
INVENTOR.
Otto Muller-Girard United States Patent Office 3,173,003
Patented Mar. 9, 1965

3,173,003
FLUID FLOW MEASURING AND COMPUTING APPARATUS
Otto Muller-Girard, Rochester, N.Y., assignor to Taylor Instrument Companies, Rochester, N.Y., a corporation of New York
Filed Apr. 29, 1960, Ser. No. 25,637
23 Claims. (Cl. 235—193)

This invention relates to the art of measuring and computation and has for a general object to provide novel instrumentalities for multiplying, dividing and root-extraction.

A particular object of the invention is to provide a combination of such instrumentalities so arranged as to automatically perform a predetermined scheme of sensing and computing operations, the end result of which is to provide a signal representative of the rate of flow of a fluid in a pipe or the like.

Another object is to provide a new and improved instrumentality or system for multiplying a number of factors, in particular, a system wherein one of the factors is reciprocally related to one or more of the other factors.

Still another object of the invention is to provide a new and improved instrumentality or system for performing the operation of division of one factor by another.

A further object of the invention is to provide a new and improved instrumentality or system for extracting a root of a factor, particularly the square root thereof.

Yet another object of the invention is to provide a root-extracting system or instrumentality composed of components that, individually speaking, are substantially linear in function under the conditions of use, yet together cooperate to produce the non-linear effect implicit in the notion of root-extraction.

Again, it is also an object of the invention to provide a substantially-fixed-gain, null-balance system having a non-linear useful output.

In addition, it is also an object of the invention to provide a null-balance, root-extracting system wherein inherent difficulties, attendant upon system operation when the root to be extracted may be zero or imaginary, are avoided.

Finally, it is an object of the invention to provide a novel multiplying mechanism particularly useful in the said square-root extracting system.

These and related objects of the invention are attained by means of apparatus and instrumentalities more particularly described hereinafter.

Many systems have been devised heretofore for the purpose of measuring rate of flow and total flow. Such systems tend to be quite complex in view of the fact that the flow is generally inferred from measurements of variables, including one or more that are non-linearly related to flow. For example, in measuring compressible fluid flow, the following approximate relation often holds:

$$Q = C\left(\frac{hP}{T}\right)^{1/2} \qquad (1)$$

where
$Q$ = mass rate of flow
$h$ = differential pressure across a restriction in the path of the flow.
$P$ = absolute pressure downstream of the restriction.
$T$ = absolute temperature of the flow.
$C$ = a parameter representing one or more factors that may be considered fixed in a given case, such as orifice coefficient, and so on.

Apparatus for solving equations like Eq. 1 are difficult to design without deliberately contriving to introduce one or more non-linear parameters in the form of non-linear mechanisms, non-linear circuit elements, and so forth. According to my invention, however, I provide a system wherein the square root operation indicated by the ½-power of Eq. 1, results from the interaction of linear elements, or, more exactly, elements of conventional design, such that in practice they would be considered linear to a close degree of approximation, for most purposes, including those of the present application.

On the other hand, according to my invention, there is provided a combination of elements for performing division, but so arranged that while certain non-linear characteristics thereof are involved in performing the operation of division, yet said elements cooperate to compensate for, or to obviate possible adverse affects of their said non-linear characteristics, and no compensating means in addition to said elements need be provided for compensation's sake alone.

The scheme of calculation adopted in my invention results from the observation that in certain types of transducers, the transducer output is proportional both to the signal to be transduced and to the power supplied the transducer for transduction purposes. For example, in the so-called LVDT, as the well-known linear variable differential transformer is termed for brevity's sake, the open-circuit voltage of the secondary winding of the transformer represents the product of the current in the transformer primary and the position of the movable core of the transformer.

As for the operation of division, or multiplication of one factor by another reciprocally related thereto, it is well known that the output of an amplifier with inverse feedback contains a reciprocal factor measured by the amount of feedback, as well as direct factors measured by the input or inputs to the amplifier. For example, an inverted amplifier of infinite gain (unfedback) with inverse feedback will have finite gain, and as well as a conductance (output current divided by input voltage) that varies directly with input voltage and inversely with feedback.

In systems, such as described supra, generally there are introduced auxiliary elements such as amplifiers, servos, etc., in order to bring up signal levels, to introduce null-balancing, as well as for more specialized purposes such as the division operation noted above. In the present instance, according to my invention, square root is extracted by a null-balance, servo-type system, without using system elements that are ordinarily considered essentially non-linear. Noting that squaring is a form of multiplication, according to my invention, I provide a multiplying instrumentality in the servo loop (of otherwise more or less routine type of a closed-loop, null-balance, servo-type system wherein the signal being balanced represents a factor the root of which is to be extracted), said multiplying instrumentality being arranged so that somewhere in the loop between an error signal and a balancing signal consequent upon said error signal, the loop signal is multiplied by itself. Accordingly, the said loop signal at the point in question becomes a measure of the root of the said factor represented by said signal being balanced.

Turning to the drawings now for a detailed description of the invention, as set forth supra:

FIGURE 1 illustrates a computing system arranged to derive from a stream of flowing fluid, an output signal representing the quantity $$\left(\frac{hP}{T}\right)$$

of Equation 1;

FIGURE 4 illustrates in some detail a structural arrangement of LVDT's suitable for use in the system of FIGURE 3.

FIGURE 5 is an enlarged-scale view in section of a detail of FIGURE 4, the section being taken on the line 5—5 of FIGURE 4;

FIGURE 6 is a view in elevation of another detail of FIGURE 4;

FIGURE 7 is a view of an amplifier and AGC network suitable for use in the system of FIGURE 3.

Figure 1:
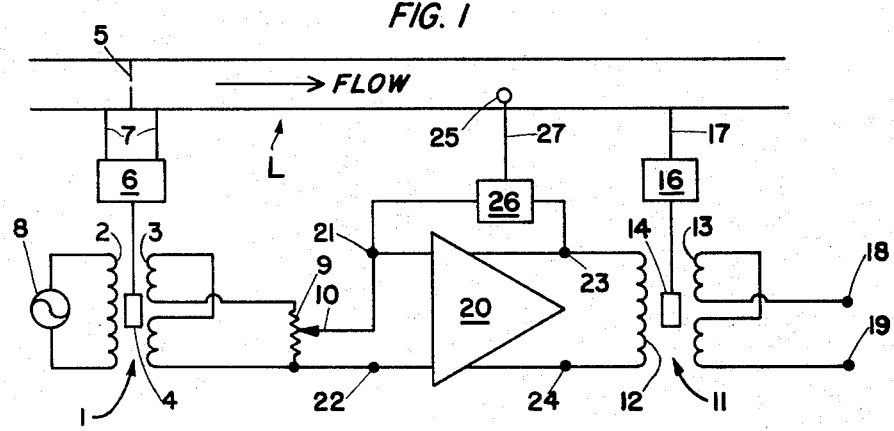

In FIGURE 1, the reference letter L denotes a fluid flow line in which obtain the fluid variables of temperature and pressure which must be considered in determining mass flow in accordance with Equation 1 supra. An LVDT 1 having primary winding 2, secondary winding 3 and movable core 4, is arranged such that the inductive coupling between the said windings varies directly with the differential pressure $h$ due to the pressure across a flow restrictor 5 in line L. Core 4 may be moved in such fashion by any suitable differential pressure sensing device, schematically indicated by the reference numeral 6, connected across the orifice 5 by appropriate piping 7. Primary winding 2 is energized by an A.C. source 8, and secondary winding 3 is connected across a resistor 9 having an adjustable tap 10 thereon. As will be obvious to one skilled in the art, the described arrangement is such that a voltage may be picked off the resistor 9 (via tap 10) that is a function of the current through primary winding 2, the pressure drop $h$ across orifice 5 and the setting of tap 10.

In order to sense the quantity P, a second LVDT 11 is provided having a primary winding 12, a secondary winding 13 and a movable core 14, said core being arranged to be moved in proportion to the absolute pressure P in line L by means of an absolute pressure sensing device 16 connected to line L by means of piping 17. Secondary winding 13 is provided with terminals 18 and 19 for connection to any suitable means for utilizing voltage induced in secondary winding 13.

Finally, an amplifier 20 is connected between secondary winding 3 and primary winding 12, said amplifier having a pair of input terminals 21 and 22, respectively connected to tap 10 and one end of resistance 9, and a pair of output terminals 23 and 24 across which is connected primary winding 12 of LVDT 11.

This arrangement of amplifier 20, as thus far described, is in accordance with the prior art practice of utilizing an amplifier to provide a satisfactory level of primary current in the primary of an LVDT where the ultimate source of primary current for the said LVDT is the secondary winding of another LVDT. Such amplification is a practical necessity in cascading LVDT's.

According to my invention, however, I utilize the amplifier-coupling of LVDT's 1 and 11 to provide the temperature factor of Equation 1, by making the conductance of the amplifier 20 proportional to $1/T$.

While the conductance of an amplifier, i.e., the ratio of output current to input voltage, may be made temperature dependent in a number of ways, I prefer to provide a temperature sensing element 25 in line L and a feedback element 26 between terminals 21 and 23 of amplifier 20, there being shown a connection 27 between feedback element 26 and temperature sensing element 25, which connection represents that feedback around amplifier 20 is adjusted in accordance with the temperature of the fluid in line L. The feedback is to be taken as negatively proportional to the voltage picked off resistor 9 by tap 10, proportional to T and proportional to the output current of amplifier 20.

It will be obvious from the foregoing that the open circuit voltage across terminals 18 and 19 of secondary winding 13 of LVDT 11 will represent the computation $$\left(\frac{hP}{T}\right)$$

Should this output be desired for its own sake, the normal practice would be to provide a third LVDT with its secondary winding connected across the secondary winding 13 of LVDT 11, in bucking relation to the voltage across winding 13, and its primary winding in series with primary winding 2 of LVDT 1, and, as well, a servo-system to sense the difference between the voltages across the said secondaries and to position the core of the said third LVDT in a sense such as to reduce said difference to zero. Such arrangement has the usual advantages of null balance systems. In addition, the mentioned series connection of LVDT primary windings would eliminate the possibility of a variable primary winding current factor from affecting the computation $$\left(\frac{hP}{T}\right)$$

since in the system shown in FIGURE 1, the voltage across secondary winding 13 does include a factor representing the current in primary winding 2. However, in the described null balance system, the said third LVDT will include the same primary current factor in the secondary winding voltage it opposes to the voltage of secondary winding 13, and therefore, the position of the third LVDT core will be independent of the primary current of LVDT 1, and will truly represent the factor $$\left(\frac{hP}{T}\right)$$

only, at balance.

Figure 2:
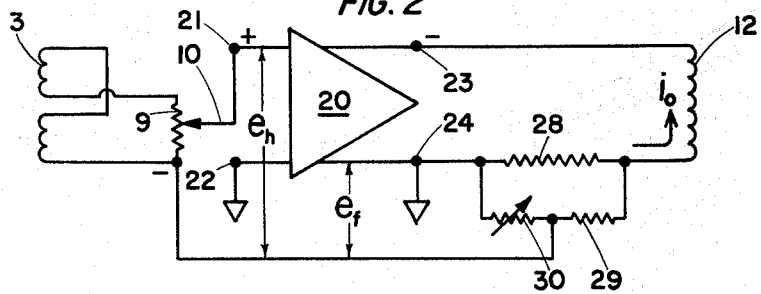
FIGURE 2 illustrates in some detail how the computing system of FIGURE 1 derives the factor $$\left(\frac{h}{T}\right)$$

In FIGURE 2, amplifier 20 is shown to be an inverted amplifier wherein the polarities of terminals 21 and 23, at any given instant are opposite in sense, whereas terminals 22 and 24 are at a point of common potential (i.e., "circuit common" as indicated by the inverted triangles connected to terminals 22 and 24.) Across the output terminals 23 and 24 are connected, in series, primary winding 12 of LVDT 11 and a feedback resistance 28. A voltage divider composed of a resistance 29 and a resistance 30, connected together in series, and the two together connected in parallel to resistance 28, provides, at the junction of resistances 29 and 30, a feedback voltage $e_f$, proportional to amplifier output current $i_o$, which voltage is summed with the differential-pressure-representative voltage $e_h$ appearing between tap 10 of resistance 9 and the lower end of resistance 9. It is evident from the designations in FIGURE 2 of polarities and output current direction, that a net error voltage equal to the difference between $e_h$ and $e_f$ appears between terminal 21 and circuit common of amplifier 20, and that the amplifier attempts to reduce the said error voltage to zero. Obviously, therefore, the output current $i_o$ is in some sense directly proportional to the voltage $e_h$ and inversely proportional to the effective feedback resistance and to the feedback voltage $e_f$. Accordingly, if $e_f$ is made to vary in proportion to absolute temperature T, $i_o$ will be proportional to $h/T$.

In theory, one might obtain this result simply by providing a temperature responsive device constructed and arranged to pick off feedback voltages $e_f$ from resistance 28 in proportion to the temperature, as by moving along resistance 28 a slider connected to $e_h$. However, the accuracy with which $i_o$ can represent $h/T$ depends on the gain of amplifier 20, and in this instance, since the conductance of the amplifier and therefore its gain is deliberately varied, it is not convenient to provide an amplifier with enough gain to satisfactorily minimize deviation of $i_o$ from $h/T$. While such deviation could be compensated for in moving the hypothetical slider aforesaid, it is desirable to avoid having to do so, since such compensation obviously implies the introduction of some non-linear mechanism, resistance card, or the like, which it were better to do without if possible.

According to my invention, variation in T is translated into proportional variations in $e_f$ by varying the value of resistance 30 in accordance with T. This has the advantage that resistance 30 can be a temperature sensitive resistance exposed to the flow in line L. Again, certain well-known types of positive temperature coefficient resistance thermometer elements are convex downward in resistance (ordinate) vs. temperature (abscissa) characteristic, that is, as resistance and temperature increase, their resistance versus temperature graphs curve toward the resistance axis. In the circuit of FIGURE 2, the relationship of $i_o$ to $h/T$, for a linearly varying resistance 30, due to the finite gain of amplifier 20, would also deviate from linearity. I have found that by using a resistance element 30 of the type just described, and, by proper choice of the values of resistances 28 and 29, the non-linearity of the aforesaid relationship can be substantially reduced.

Selecting values of resistance 28, 29 and 30 requires only routine calculation, the general idea being to choose a resistor 30 that has a steeper slope of its resistance versus temperature graph than is needed (since resistor 29, which should be substantially temperature insensitive, will decrease the effect of the resistance versus temperature characteristic of resistance 30).

Most of $i_o$ should flow through resistance 28 rather than through resistance 29 and 30, hence, resistance 28 will be small compared to resistances 29 and 30. The end effect is that resistances 29 and 30 shunt around feedback resistance 28, a current that varies when absolute temperature varies. Hence, as T increases, the negative feedback voltage $e_f$ increases because $e_f$ is proportional to resistance 30 divided by the sum of resistance 29 and resistance 30. Since $i_o$ is proportional to $h$, and is divided by a factor proportional to T, it will represent $h/T$.

It will be obvious from the foregoing that FIGURE 2 represents an $h/T$ computing element of a very simple, reliable and accurate type. Since the multiplication ($hP$) is involved also, it is convenient to use current generated feedback which has the advantageous effects of raising both the input and output impedance of amplifier 20. As a result, the secondary winding 3 of LVDT 1 works into a practically fixed impedance. On the other hand, the increased output impedance of amplifier 20 decreases the effect on $i_o$ of such variation in the impedance of the primary winding 12 of LVDT 11, as may occur, for example, due to temperature-caused variation in winding resistance.

It will be noted that the system illustrated by FIGURES 1 and 2 involve in the computation $hP/T$ only the cores 4 and 14 as movable parts (except, of course, for various adjustments, such as resistance 9, which would be provided in practical systems to set, in a given case, range, span, zero and other constants of the system). Moreover, though under the conditions of use, amplifier 20 and the temperature sensitive resistance 30 have inherent non-linearities, the effects of these oppose, and hence, cancel out. LVDT's 1 and 11 and resistance 30 are routinely available commercial items and by basic design, amplifier 20 is a routine inverted amplifier that has a response band width around the frequency of source 8 of sufficient width to permit stable operation over the desired range of variation of the applied feedback.

Having obtained the signal $$\left(\frac{hP}{T}\right)$$

say in the form of the A.C. voltage across the terminals 18 and 19 of LVDT 11, as described supra, various applications may be made of said signal, such as using it as a control signal, or otherwise as a source of information as to total flow, or rate of flow, etc., in line L. Such applications generally involve providing some means for extracting the square root of the squared flow signal represented by the voltage across terminals 18 and 19.

Figure 3:
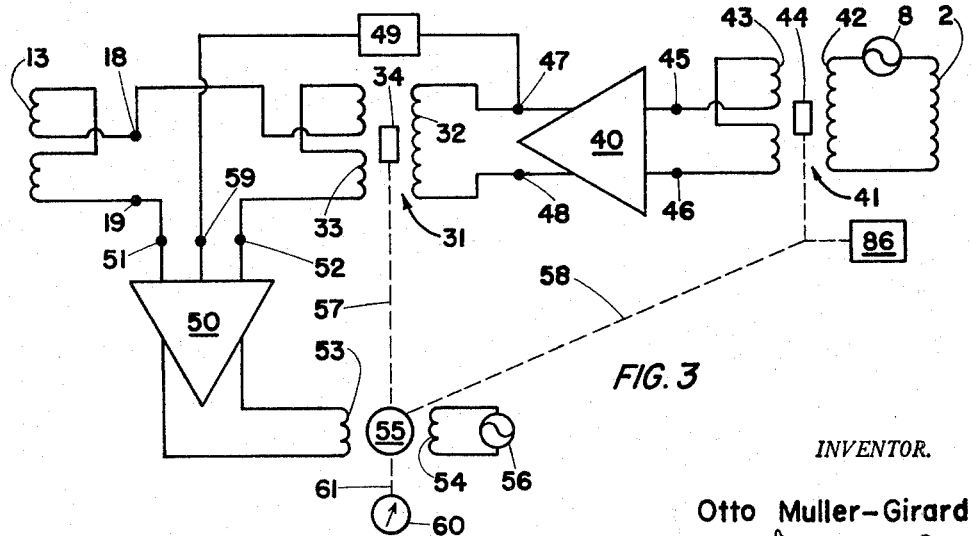
FIGURE 3 illustrates a square root extracting computing system of the null-balance type arranged to extract, from the output signal of the system of FIGURE 1, an output signal representing the quantity $$\left(\frac{hP}{T}\right)^{1/2}$$

According to my invention, I provide a novel instrumentality, illustrated in FIGURE 3, for measuring an A.C. voltage such as that appearing across terminals 18 and 19, FIGURE 1, by balancing it against another A.C. voltage and extracting the square root of the first said A.C. voltage in the process of balancing the said voltages.

As shown in FIGURE 3, there is provided an LVDT 31, having primary winding 32, secondary winding 33 and movable core 34. An amplifier 40 couples LVDT 31 to an LVDT 41, the latter having a secondary winding 43 connected to the input of amplifier 40 and the former having its primary winding 32 connected to the output of amplifier 40. LVDT 41 also has a primary winding 42 and a movable core 44.

Since the square root extracting system of FIGURE 3 is intended to be used with the computing system of FIGURE 1, secondary winding 13 of LVDT 11 is shown connected across secondary winding 33 of LVDT 31 via the input terminals 51 and 52 of an amplifier 50. The output of amplifier 50 terminates in a control winding 53 of a motor 55, said motor also having a reference winding 54 energized by an A.C. reference source 56. The rotor or other positioning element of the motor 55 has its positioning output coupled by linkage functionally indicated by broken lines 57 and 58 to cores 34 and 44, for movement of the latter in proportion to the said positioning output.

Also there is provided suitable circuitry for deriving an AGC signal from amplifier 40 for amplifier 50, said circuitry being denoted schematically by box 49 connected between one output terminal 47 of amplifier 40 and a terminal 59 of amplifier 50.

Finally, the initial energization for the signal path through the combination of LVDT's 31 and 41 and amplifier 40 is provided by A.C. source 8, primary winding 42 of LVDT 41 being placed in series with primary winding 2 of LVDT 1 across source 8.

Since the system of FIGURE 3 is intended to work on a null balance principle, the various winding connections are so phased that the voltage across secondary winding 13 opposes the voltage across secondary winding 33. Likewise, amplifier 50 is designed so that unless the voltage drop across its terminals 51 and 52 be zero, a net voltage will appear across control winding 53, said net voltage having a sense and magnitude corresponding to that of said voltage drop. A null balance will therefore be brought about if linkage 57 and 58 are so constructed and arranged that motor 55, via said linkage, positions cores 31 and 41, in a sense such as to reduce the voltage drop across terminals 51 and 52. Therefore, as will be obvious to one skilled in the art, in operation, the system of FIGURE 3 will keep the voltage across secondary winding 33 equal and opposite to the voltage across secondary winding 13. Moreover, the series connection of source 8 and primary windings 2 and 42, will eliminate a source current factor from the computation $hP/T$ made by the system of FIGURE 1.

As thus far described, the balancing action of the system of FIGURE 3 accords generally, in overall result, with prior art practice.

However, insofar as I am aware, the prior art does not teach the use of two LVDT's to produce the balancing voltage which amplifier 50 compares to the computation voltage which is the output of the system of FIGURE 1, and it is just this feature that permits extraction of the square root by the system of FIGURE 3.

Like VLDT's 1 and 11, LVDT's 31 and 41 perform a multiplication, in this instance, position of core 31 by the position of core 41.

Since core 31, core 41, linkage 57 and linkage 58 are each positioned by the same device, core position, linkage configuration, motor position (more exactly, in the case of typical servomotor, total angular travel of the rotor thereof with respect to some fixed reference), etc., are each representative of the position of any of their fellows. In particular, if linkage 57 is identical to linkage 58, LVDT's 31 and 41 likewise, and so on, the position of core 41 will be identical to the position of core 31. Hence, if core position is X, the balancing voltage from winding 33 will be proportional to $X^2$, and since it is also proportional to $$\left(\frac{hP}{T}\right)$$

at balance, then X is proportional to $$\pm\left(\frac{hP}{T}\right)^{1/2}$$

which is the desired result, namely: a signal or output quantity representative of the flow through orifice 5 in line L, FIGURE 1.

By providing an indicator 60 to indicate core position, or the like, the scale of the indicator will be defined by equispaced graduations interpretable as a linear scale of flow square root or like factor. In the form shown in FIGURE 3, a linkage 61 is connected to motor 55 to drive indicator 60 in parallel with cores 31 and 41 and in linear proportion to their position X. It is not necessary, of course, that LVDT's 31 and 41, or linkage 57, 58 and 61 be identical, since all that matters is that each of the various elements move in fixed linear proportion to the position output of motor 55, and that core movement result in linear primary-secondary coupling variation in the LVDT's with respect to said position output, whereby the position of each of the involved elements will have a fixed definite ratio to the position of any of its fellows and therefore may be taken as a measure of $$\left(\frac{hP}{T}\right)^{1/2}$$

It is evident from the foregoing that my novel root extracting system may be made up of elements, that, individually taken, are nominally linear devices such as are readily available commercially. Nevertheless, the multiplier action of LVDT's 31 and 41 injects a non-linearity into the servo loop including amplifier 50, motor 55, linkage 57 and 58, LVDT's 31 and 41, and amplifier 40.

That is, while the necessary balancing voltage is proportional to $X^2$, the square of core position, motor 55 has only to establish core position X, in order that the correct balancing signal result. Therefore, if amplifier 50 has fixed gain, it will respond to a given change $\Delta e_s$ in the error signal across terminals 51 and 52 with the same output change $\Delta X$, irrespective of where $\Delta e_s$ occurs in the total flow range to be covered. If, for example, the flow signal $hP/T$ goes from a state of balance at zero to another state of balance at ¼ of its full range to produce error voltage $\Delta e_s$ which is balanced by core movement $\Delta X$, and then goes to ½ of its full range and motor 50 tries to balance by means of a further core movement $\Delta X$, it will overshoot because, while in the first case the balancing voltage corresponds to $(\Delta X)^2$, at ½ range the voltage representing $hP/T$ needs a balancing voltage corresponding to twice $(\Delta X)^2$. However, the total core position change from zero to ½-range is twice $\Delta X$, and therefore, the balancing voltage would be $4(\Delta X)^2$, which is too large. Conversely, if the gain characteristic of the system is looked at from the point of view of starting from the upper end of the range and going down, it will be found that a decrease in $hP/T$ evokes a change in X that is insufficient to produce a balancing voltage change equivalent to the change in $hP/T$.

In short, the non-linearity introduced by multiplier action can cause the response of the system to be unstable and, as well, sluggish, unless $hP/T$ stays close to a value where change therein evokes a change in X equivalent to the corresponding change in square root of $hP/T$.

According to the invention, prompt stable system response is assured by causing the gain of amplifier 50 to vary in inverse proportion to X, i.e., core position. In the system of FIGURE 3, this result is brought about by providing the automatic gain control (AGC) voltage generator or circuit 49 which injects an AGC voltage into amplifier 50 via terminal 59, AGC circuit 49 being connected to terminal 47 for control of the AGC voltage by the output current of amplifier 40. Supposing amplifier 50 to be of the vacuum tube type, AGC generator 50 can be any well-known arrangement of diodes, capacitors, etc., arranged to abstract an insubstantial, determinate portion of said output current from terminal 47 and to turn said fraction of current into a negative-going grid voltage suitable for biasing one or more voltage amplifier tube grids in amplifier 50, the arrangement being that as $$\left(\frac{hP}{T}\right)^{1/2}$$

increases, the bias on said one or more grids goes more and more negative, and, as a result, the gain of amplifier 50 decreases as $$\left(\frac{hP}{T}\right)^{1/2}$$

increases.

Thus, variation in system gain due to the multiplier action of LVDT's 31 and 41, tends to be compensated for by the AGC action on amplifier 50. Compensation need not be (and is unlikely to be) closely exact, since real system components have certain tendencies which may also be taken advantage of in designing for good system response. For example, a practical amplifier 50 tends to integrate the error signal across its terminals 51 and 52, thus correcting gain inadequacies to a certain extent. On the other hand, friction in the moving parts of the system, D.C. in the windings of motor 55, and other damping influences tend to stabilize the system. Once the major part of the need for gain compensation is taken care of by AGC, the problem of design of the system becomes that involved in choosing the elements of the usual supposedly linear system so as to obviate difficulties with the residual non-linearities on the order of those a servo system invariably contains.

AGC of amplifier 50 is the expedient choice for compensating for variable gain, although the origin of the AGC voltage obviously need not be the output of amplifier 40, the voltage input to amplifier 40 being another possibility. The AGC voltage corresponds ultimately to the position output of motor 55, hence, the latter could be used to control the magnitude of an independent source of AGC voltage. Doubtless, other ways of gain compensation may be conceived, but all would resolve essentially to the basis of core or motor position. The particular expedient I have shown in FIGURE 3 has the characteristics of optimum simplicity, and straight forwardness, since it requires only an AGC network of passive elements which, once taught by me as a compensating influence, can be designed and applied by routine exercise of the skill of the art, without difficulty. Moreover, amplifier 40 is a practical necessity, with or without AGC, hence, its use as the source of AGC simplifies system design.

FIGURE 7 illustrates a typical example of specific circuitry for obtaining AGC for the purposes of FIGURE 3. In FIGURE 7, a transformer 111 is provided for coupling an amplifier section 40A to primary winding 32 of LVDT 31, the ends of which are connected to terminals 47 and 48. One end of a secondary winding 113 of transformer 111 is connected to terminal 47, and a tap on winding 113 is connected to a terminal 114, the other end of windings 113 being a terminal 110. Transformer 111 also has a primary winding 112 connected in any usual way to an output tube or to several tubes, or equivalent, (not shown), of amplifier section 40A. Transformer 111 and amplifier section 40A (e.g., several stages of vacuum tubes or the like) thus represent amplifier 40 of FIGURE 3.

Amplifier 40, i.e., transformer 111 and amplifier section 40A together, is a high-gain, inverted amplifier which by virtue of feedback produces an output current directly proportional to its input voltages. For purposes of feedback, one end of secondary winding 32 of LVDT 31 is connected to terminal 114 by way of feedback resistances 121 and 122 and circuit common, (indicated by the inverted triangles depending from terminals 114 and 45, FIGURE 7). Resistance 121 has a movable tap 120 connected to an end of secondary winding 43 of LVDT 41 for span adjustment purposes; that is, the conductance of amplifier 40 can be set by varying the amount of current-generated, voltage-type, negative feedback picked off resistance 121 by tap 120.

The current flow through the entire winding 113 of transformer 111, a fraction of that through winding 32, is full-wave rectified by a pair of diodes 115 and 116, smoothed by capacitor 117 and conducted to circuit common of amplifier 50 via a variable resistance 118 having a movable tap 119 connected to terminal 59 of amplifier 50, whereby a negative-going AGC of desired magnitude and range of variation can be applied to the grids of one or more voltage amplifying tubes or equivalent (not shown), of amplifier 50. Accordingly in the operation of the system of FIGURE 3, increase of current through winding 32, due to increase in core position X, increases the negative bias at terminal 59 of amplifier 50, whereby the gain of amplifier 50 decreases, which is the desired result.

AGC takes care of the matter of variable loop gain. However, in addition to loop gain, it is also necessary to consider system characteristics at zero and negative values of $$\left(\frac{hP}{T}\right)$$

Since the zero values implies infinite gain for amplifier 50, the system cannot properly operate so as to extract roots below a certain small positive value corresponding approximately to the highest gain amplifier 50 can have. Likewise, if $$\left(\frac{hP}{T}\right)$$

goes negative (e.g., if flow reverses and if the instrumentality measuring $$\left(\frac{hP}{T}\right)$$

is capable of putting out a negative flow signal) the system of FIGURE 3 obviously cannot extract imaginary roots.

Furthermore, if the system does somehow get to zero and $$\left(\frac{hP}{T}\right)$$

then assumes a finite positive value, the system is as likely to attempt to extract the negative root of said value as it is to extract the positive root thereof.

The finite gain of amplifier 50 would apparently bar the system from ever getting below some definite, positive value of $$\left(\frac{hP}{T}\right)^{1/2}$$

thereby precluding any system attempt at extracting imaginary roots or at getting on to the negative branch of the square root. This would be the case, if system operation could be restricted to computation action as described supra.

However, the idiosyncracies of servo systems are such that the system may get into a zero state, anyway, when $$\left(\frac{hP}{T}\right)$$

is zero or quite small. Therefore, if $$\left(\frac{hP}{T}\right)$$

begins to increase positively from zero while the system is in a zero state, the rebalancing action of the system is as likely to take off in the direction of negative values of $$\left(\frac{hP}{T}\right)^{1/2}$$

as it is to go in the direction of positive values of $$\left(\frac{hP}{T}\right)^{1/2}$$

Should the system attempt to extract the negative root, the initial motion of cores 34 and 44 will be in a direction such as to increase, not reduce, the error signal across terminals 51 and 52; that is, the rebalancing motion of cores 34 and 44 no longer exercise a nulling or negative feedback effect, but rather a positive feedback effect. Therefore, once the motor 55 starts cores 34 and 44 off in the wrong direction, the positive feedback sends the cores further along in the wrong direction, until the mechanical elements of the system stall at some limit of motion imposed by the structural arrangement of the moving elements of the system.

Another difficulty with system zero may be expressed to the effect that it is impossible to get a "live" zero if system operation is maintained in a non-linear mode of zero. That is, since the slope of the square root function becomes zero at zero, the system eventually arrives at a point where a change in error voltage at terminals 51 and 52 results in a change in core position that does not in turn further change said error voltage. Therefore, at some minimum positive value of $hP/T$, the system square-root range will end in a dead spot, which is undesirable for reasons of accuracy and constancy of calibration of the root extracting system, and as well, of larger systems including the former system as a part thereof, as where a plurality of $hP/T$ transmitters are arranged to be scanned by the root-extracting system in order to sample in some predetermined order the rates of a plurality of flows, given by the outputs of transmitters.

The same effect—a "dead" zero—would also be inherent in the square-root extracting system in which differential or double-ended devices like LVDT's 31 and 41 are not utilized. Since the LVDT's 31 and 41 are by their nature and nomenclature such devices, the "dead" zero in this case may be traced back to the inherent non-linearity of the system and the finite gain of amplifier 50.

According to my invention, however, the above-described zero difficulties are eliminated and a live zero is obtained by suppressing the square root extraction character of the balancing action for an interval of $$\left(\frac{hP}{T}\right)$$

including the value zero. This may be done mechanically by providing a stop or abutment to prevent the balancing action of the system of FIGURE 3 from moving one of the cores 34 and 44 whenever the value of $$\left(\frac{hP}{T}\right)$$

is in the said interval, such expedient being functionally indicated in FIGURE 3 by a box labeled 86, connected by dotted lines to linkage 58. At the same time, the other of said cores is allowed to continue balancing action by producing a balancing voltage when $$\left(\frac{hP}{T}\right)$$

is in the said interval, whereby the output of the system of FIGURE 3 represents not $$\left(\frac{hP}{T}\right)^{1/2} \text{ but } \left(\frac{hP}{T}\right)$$

In the aforesaid interval, which would cover low values of flow, there is little advantage in obtaining the square root of the flow signal $$\left(\frac{hP}{T}\right)$$

since at this point, the flow signal is generally more degraded by errors in the process of measuring it than is the square root indication by the error due to taking the flow signal $$\left(\frac{hP}{T}\right)$$

itself as a measure of its square root.

Also, at or near zero values the square root mode of operation would make greater demands on gain of the amplifier 50 and system stability than can be satisfied. In the system of FIGURE 3, however, since for values of $$\left(\frac{hP}{T}\right)$$

less than that at which square root extraction begins, the position output of motor 55 bears a simple straight line relation to the flow signal $$\left(\frac{hP}{T}\right)$$

the flow signal may go all the way to zero, or even go negative (reverse flow), but the servo system will still track the flow signal. Naturally, if the flow signal increases sufficiently the blocked core will be pulled away from its stop whereby the square root extraction will begin again and continue as long as $$\left(\frac{hP}{T}\right)$$

stays high enough.

FIGURES 4 and 5 show a novel and ingenious structural arrangement of LVDT's 31 and 41 suitable for use in the system of FIGURE 3 and including stop and escapement mechanism for automatically changing the non-linear balancing action of the system of FIGURE 3 to a linear balancing action, and vice versa, at an appropriate point.

In FIGURE 4, a rotary cam 62 is mounted on a rotatable shaft 63, forming part of a drive mechanism 64, which last represents mechanism for providing the position output of motor 55 in the form of rotation of shaft 63. In a typical case, driving mechanism 64 will include a train of reduction gears or equivalent for converting the many revolutions of a typical servomotor to approximately one revolution of shaft 63, and therefore of cam 62, over the entire range of $$\left(\frac{hP}{T}\right)^{1/2}$$

to be extracted.

A lever 66, having one end pivoted at 67 for deflection of its other end in the plane of rotation of cam 62, has a spherical or cylindrical follower 68, pivoted for rotation on a pin 69 fixed to the said other end of lever 66, said pin oriented so that follower 68 rotates about an axis parallel to the axis of rotation of cam 62. The cam and lever are arranged so that the follower 68 rests on the periphery of cam 62. Taking a vertical line through the center of rotation of cam 62, the pivot 67 is so located that the line or point of contact between cam 62 and follower 68 is offset (as indicated at 0 in FIGURE 4) slightly from said vertical line, the offset being to that side of the vertical line such that the tangent to the surface of the cam at the contact between it and follower 68 is more nearly parallel to the lever arm of the lever than it would be if the offset were zero or on the other side of said vertical line. The offset allows the deflection of points on lever 66 to be treated as vertical displacements with less error than otherwise, whereas the more nearly horizontal the said tangent, the more nearly the said vertical displacement remains fixed in the face of thermal expansion of the structural elements involved.

Suitable support means (not shown) are provided for rotatably supporting the shaft 63 and pivot 67 in positions that are fixed in space relative to each other.

Cam 62 is a simple linear rise cam, i.e., if cam 62 is rotated counterclockise from the position shown, the radius of the peripheral point of cam 62 contacted by follower 68 decreases in direct linear proportion to the angle of rotation of the cam for most of a revolution thereof.

At some intermediate point of lever 66, a pivot 70 is provided for pivoted connection of said lever to a slug or core assembly, to be described later, the axis of pivoting being parallel to the pivot axis at pivot 67. Hence, as cam 62 is rotated, the pivot 70 is displaced in a slightly arcuate path that may be considered straight and vertical within the limits defined by the total rise of cam 62.

A pair of LVDT supports 71 and 81 are provided for supporting LVDT's 31 and 41 with their coil or winding assemblies coaxially arranged on either side of the lever. Since supports 71 and 81 are identical except that one is inverted with respect to the other, a description of support 71 will suffice for both.

Support 71 comprises a fixed bracket composed of plates 72 and 73, secured at their ends at right angles to each other, and fixed in space relative to the cam shaft 63 and pivot 67 by support means (not shown). A third plate 74 has one end thereof pivoted at 75 to the upper end of plate 73, the axis of pivoting being oriented so that plate 74 can be deflected in the plane of deflection of lever 66.

A screw 76 cooperates with tapped holes in plates 72 and 74 to fix the angular position of plate 74 while permitting adjustment of its angular position, play between said plates being taken up by one or more springs 79 compressed between plates 72 and 74. Screw 76 includes a threaded portion 78, tapped into plate 72, and a threaded portion 77, tapped into plate 74, the pitch of the latter threaded portion being coarser than that of the former in order that as the screw is turned, the length of threaded portion 79 passing through plate 74 will be greater than that passing through plate 72. One (or both) of the holes tapped in plates 72 and 74 for screw 76 is made a slightly loose fit for the screw portion threaded therein, in order to allow for the tilting of the screw axis as screw 76 is turned.

The free end of plate 74 terminates in an apertured portion 74A, in which the cylindrical winding assembly of LVDT 31 is fixed by means of set screw 80.

LVDT supports 71 and 81 are fixed in position so that the axes of cores 34 and 44 and their displacement path substantially coincide with a vertical line through pivot 70 on lever 66.

The overall core assembly comprises cores 34 and 44, spacers 82, 83, 84 and 85, and an interconnecting and escapement device, indicated generally by reference numeral 86. Device 86, which will be described later, is connected to pivot 70, and at either end to spacers 83 and 84.

Each of the said spacers are generally cylindrical with threaded pin elements, such as shown in broken line at 88, tapped into core 44, there also being provided flats such as shown at 89 on those parts of spacers adjacent core ends to reduce eddy currents in the spacers. Each spacer element may be alike in respect of the said pins and flats.

At its upper end spacer 82 is terminated by a reduced-diameter, vertical guide element 92 passing through a hole 91 in fixed plate 90. Between the plate 90 and a washer 93 on guide element 92, a spring 94 is arranged to urge the spacer 82 toward lever 66 and device 86; device 86 having a threaded pin 87, tapped into spacer 83.

The remainder of the core assembly, namely spacers 84 and 85, and core 44 are supported by device 86. However, an adjustable stop screw 97, arranged to thread up and down, through a fixed plate 96, limits the downward travel of core 44, device 86 being provided with overthrow or escapement means that allow lever 66 to continue to let core 34 and its spacers down, even though the lower end of spacer 85 is in contact with the other end of stop screw 97.

FIGURE 5 illustrates connecting and escapement device 86 in detail, wherein the body of the device is shown to be a generally cylindrical body 100, having threaded pin 87 at its upper end for connection to spacer 83, and an axial bore 101 in the lower end thereof. Spacer 84 is provided with a vertical extension 102 loosely received in bore 101.

A pair of vertically extending slots 103 are provided opposite each other in the bored part of body 100, and extension 102 of spacer 84 has affixed thereto a cross pin 104, the ends of which pass through slots 103. Body 100 also has a cross pin 105 which is affixed to the body at any convenient point past the upper extremity of extension 102.

Cross pin 104 is urged against the lower ends of slots 103 by means of a spring 106 compressed between a pair of washers 108 and 107 between and abutting the respective pins 104 and 105. Spring 106 is chosen to be weaker than spring 94 (FIGURE 4).

Assuming that in the configuration of parts shown in FIGURE 4, there also obtains the configuration of parts shown in FIGURE 5, counterclockwise movement of cam 62 obviously cannot cause lever 66 to let down core 44, since stop screw 97 will not permit. However, as cam 62 rotates, spring 94, which is stronger than spring 106, forces follower 68 to remain in contact with the cam because the force of spring 94 causes body 100 to move down and, via pin 105 and washer 107, to compress spring 106, slots 103 permitting such motion.

For the purposes of the system of FIGURE 3, and taking the position of cam 62 shown in FIGURE 4 to that corresponding to the largest value of $$\left(\frac{hP}{T}\right)^{1/2}$$

the position of the LVDT's 31 and 41 is such that at that point both will be producing a voltage of the same phase and of the same value (assuming identical LVDT's). Since, it is desired, as cam 62 begins to move counterclockwise, that both said voltages will decrease in linear proportion to the cam angle until some convenient point such as 10% of scale reading of indicator 60 (FIGURE 3) is reached, stop screw 97 is moved far enough downward from the position shown in FIGURE 4 that the lower end of spacer 85 does not strike the upper end of the stop screw until the cam moves counterclockwise far enough to bring the indicator of indicator 60 to 10% of scale. Hence, from 100% of scale to 10%, spring 106 will hold pin 104 against the lower ends of slots 103, whereby cores 31 and 41 will move as one and cause both of LVDT's 31 and 41 to cooperate to produce a balancing voltage equal and opposite to the voltage representing $$\left(\frac{hP}{T}\right)$$

at balance, whereas, from 10% down, core 44 will remain at its 10% point, and further change in the balancing voltage will be given only by LVDT 31.

A further guide bore 91 may be provided in plate 90 to receive the guide element of a third LVDT (not shown), the core assembly of which would be connected to a member 98 pivoted at 99 on lever 66, for the purpose of transmitting a square root signal to some remote apparatus such as a controller, indicator or the like. Obviously, any or several of a number of types of transmitting devices, which specifically differ from LVDT's may be actuated by the position output of lever 66 or by the angular position output of shaft 63, for the purpose of converting said position output or said angular position to various types of signals representing $$\left(\frac{hP}{T}\right)^{1/2}$$

FIGURE 6 is an end view (from the left as seen in FIGURE 4) of support 71 (and of support 81, inverted). The aperture in plate portion 74A is shown in broken line and denoted by the reference numeral 74B. Plate 73 is seen to have upstanding ears 73A through which pivot pin 75 passes to pivotally support the right extremity (as seen in FIGURE 4) of plate 74, and there is seen to be two springs 79 loading the plate assembly.

The set screw 80 is used to roughly position the cylindrical body of the LVDT 31 (not shown in FIGURE 6) in aperture 74B, and likewise in the case of support 81 and LVDT 41. Initially, with stop screw 97 backed-off, the zero flow radius of cam 62 in contact with follower 68, LVDT's are adjusted roughly as aforesaid to vertical positions where their secondary voltages are close to null. The screw 76 of support 71 (and its counterpart in support 81) are then used as fine adjustments to get an exact null. Supposing the LVDT's to be linear, their secondary voltages will remain in a constant ratio to one another (1:1, if the LVDT's are identical) as the cam 62 is rotated to bring increasing rise to follower 68. This state of adjustment having been reached, stop screw 95 may be turned up until it just contacts the bottom of spacer 85 at the 10% of scale point, as more particularly explained hereinbefore.

While 10% of scale indication is the point to make the transition between linear and non-linear operation is expedient insofar as fluid flow is concerned, such value is given only by way of example. Obviously, the system of FIGURE 3 will extract the root of any value or factor represented by the output voltage of signal winding 13 of LVDT 11 and, the quality of the signal warranting it, the transition could as easily be lowered or raised from the 10% value used in the present example of our invention.

It will be noted that adjusting the mechanism involves establishing a zero point for cam 62 at LVDT null. If cam 62 were a non-linear cam, say, with a rise proportional to the square of the cam angle, relating cam zero and LVDT null would be quite difficult. That is, while in theory a square function cam and one balancing LVDT could be used to extract square root, one point on the cam would have to be exactly located in terms of LVDT output. Any error in locating that point would be a progressively varying error due to the nature of the non-linear rise of the cam, and this error would be in addition to those involved in profiling the cam in manufacture.

With the linear cam 62, however, there is no zero error due to the fact that the rate of rise of the cam is constant. The only consideration in choosing a cam zero would be to orient it so that enough cam travel is left to cause the LVDT cores to move from their starting position to 100% of indicated scale range, in direct proportion to cam angle.

A little reflection will show that any conceivable non-linear linkage poses a problem in zeroing it. In the particular case of a non-linear cam, it would also be difficult to switch over from square root to linear indication as simply and accurately as this is done in the system of FIGURE 4.

It is also to be noted that the hypothetical possibility of using one LVDT and a square-function cam for balancing, does not avoid the non-linear variation of loop gain which the multiplier action of LVDT's 31 and 41 introduces in the system of FIGURE 3, and therefore also involves the need for AGC or equivalent.

While cam 62 is only one of a number of mechanical expedients for moving cores 34 and 44 linearly, the cam is preferred for optimum service, life and relative ease of manufacture to the precision required (total range of core movement would normally be a tenth of an inch or so, or less). In fact, the cam mechanism and LVDT's in the structure of FIGURE 4 particularly suit my novel square root extracting system to use in multi-point systems, i.e., where a large number of transmitting systems such as shown in FIGURE 1 are cyclically connected, one after another to a receiving system such as shown in FIGURE 3, and where it is desirable that long-life components such as LVDT's and cams be used, as opposed to less durable elements such as slide wires, bar linkages, etc.

I have not described amplifiers 20, 40 and 50 in detail, although as has been indicated supra, by reference to vacuum tubes, it is convenient to use vacuum tube types. However, it will be evident to those skilled in the art that suitable transistor types could be designed for the service required in my invention. In any event, insofar as the present invention is concerned, what is in the boxes 20, 40 and 50 is of no concern as long as they are devices having the input-output characteristics demanded by the systems in which they are used.

The foregoing description will enable those skilled in the art to practice my invention in the best form known to me thus far. However, while the overall purpose of my invention is to provide a combination of instrumentalities for performing the scheme of measurement and computation implied by Equation 1, supra, it will be evident to those skilled in the art that certain of said instrumentalities are of utility apart from said combination and/or said scheme, and that various modifications of the invention may be made without departing from the scope and spirit of the invention and its objects as these are described herein. I therefore desire that the claims appended hereto be construed accordingly, at least to the extent permitted by the limitations directly expressed therein.

I claim:

1. A multiplier system, said multiplier system including a first device producing a voltage proportional to a first value, an amplifying device responsive to said voltage to produce a current, and a third device producing a further voltage varying in accordance with a second value, said amplifying device having feedback means arranged to oppose a feedback voltage to the first said voltage, said feedback voltage being generated by said current, and said third device being responsive to said current to cause said further voltage to vary in accordance with said current; said feedback means including impedance means variable for controlling the amount of said feedback, said impedance means being operable in accordance with a third value to make said amount of said feedback vary in proportion to said third value whereby said further voltage is representative of the product of the said first and second values divided by the said third value.

2. The invention of claim 1 where in a small part of the said current flows through said impedance means and said impedance means has a terminal at which appears a voltage proportional to said current, and the first said voltage is connected to said terminal, said terminal being an input terminal of said amplifying device.

3. The invention of claim 2 wherein said impedance means is a resistance and at least a portion of said resistance has a positive temperature coefficient of resistance that is convex with reference to the temperature axis of a graph of its resistance versus temperature.

4. In combination, a first transducer having a pair of output terminals and being responsive to a first quantity to produce at its said output terminals a voltage proportional to said first quantity, a second transducer having a pair of output terminals and a pair of input terminals and being responsive to a second quantity to produce at its said output terminals a voltage, that is proportional to the product of said second quantity and a current applied to its said input terminals, and coupling means coupling said output terminals of said first transducer to said input terminals of said second transducer, said coupling means being arranged to apply a current to said input terminals that is representative of the said voltage produced at the said output terminals of said first transducer, whereby the said voltage at the said output terminals of said second transducer is controlled in accordance with the product of the said quantities, and means responsive to a third quantity, the last said means being operatively connected to said coupling means and arranged to decrease the said current in proportion to said third quantity, whereby the last said voltage represents the said product divided by a factor proportional to the value of said third quantity.

5. In combination, a first transducer having a pair of output terminals and having means responsive to a first condition to produce at its said output terminals a voltage representative of the value of said first condition; a second transducer having a pair of input terminals and a pair of output terminals, said second transducer having means responsive to a second condition to produce at its said output terminals a voltage representative of the value of said second condition, said second transducer being so constructed and arranged that if a current source is applied across its said input terminals, the said voltage at its said output terminals will represent the product of the value of current flowing between the last said terminals and the value of said second condition, an amplifier constructed and arranged to couple the voltage output of said first transducer to the said input terminals of said second transducer in such fashion as to cause a current to flow between the said input terminals of said second transducer, impedance means for deriving a negative feedback voltage from the last said current in proportion to the value thereof, means for opposing said negative feedback voltage to the voltage output of said first transducer, said impedance means including means responsive to a third condition for causing the said impedance means to vary the said negative feedback voltage in proportion to the value of said third condition, whereby the output voltage at the said output terminals of said second transducer is representative of the product of the values of said first and second conditions, the said product being divided by the value of said third condition.

6. Means for computing a quantity of the form $$\frac{XY}{Z}$$

said means including a first transformer including movable core and primary and secondary windings coupled by said core, X-responsive means for moving said core so as to vary the coupling between said windings in direct proportion to the value of X; a variable conductance high gain amplifier having an input and an output, Z-responsive means for varying the conductance of said amplifier in inverse proportion to the value of Z; a second transformer including a movable core and primary and secondary windings coupled by the last said core, Y-responsive means for moving said last said core so as to vary the coupling between the last said primary and secondary windings in direct proportion to the value of Y; said primary winding of said first transformer being connected to an A.C. source, and said secondary winding of said first transformer being connected to supply its voltage to the said input of said amplifier, said amplifier being constructed and arranged to produce an output A.C. current that is inverted with respect to an A.C. voltage applied to said input and that is in proportion to the conductance of said amplifier; said second transformer being connected to said output so as to have said output A.C. current as the supply current for said second transformer; whereby the voltage across said secondary winding of said second LVDT is proportional to the said quantity $$\frac{XY}{Z}$$

7. A computing element for dividing a variable condition by temperature, said element including a finite-gain amplifier having an input and an output, means for providing said input with an input voltage proportional to the value of said variable condition, and means for drawing from said output a current in response to said voltage, circuitry including a feedback resistance arranged so that said current flows therethrough and a connection arranged to apply a feedback voltage proportional to the voltage drop across said resistance to said input in opposition to said input voltage, whereby the conductance of said amplifier is equal to said input voltage divided by said current; said circuitry also including a temperature sensitive resistance connected at one end to one end of said feedback resistance and a further resistance connected to the other end of said feedback resistance, the remaining ends of said temperature sensitive resistance and said further resistance being connected together and to said connection for supplying the said feedback voltage; said temperature-sensitive resistance having a temperature versus resistance characteristic that is curved in a sense having an effect opposite to and more marked than the effect of the curvature of amplifier conductance due to the finite gain of said amplifier, and said further resistance being chosen such as to reduce the effect of said curvature of said characteristic just enough that characteristic curvature effect and conductance curvature effect substantially cancel out, whereby the said current is substantially proportional to the value of said variable quantity divided by the value of the temperature of said temperature sensitive resistance.

8. In combination, a first computing element adapted to produce a first output signal in response to and representative of a first input signal applied thereto, said computing element having a conductance defined by the ratio of the value of said first output signal to the value of said first input signal, feedback means for deriving from said first output signal a feedback signal that is proportional to the value of said first output signal, said feedback means being operable to vary the value of said feedback signal and said feedback means being arranged to oppose said feedback signal to said first input signal, whereby the value of said first output signal is proportional to the value of said first input signal divided by a factor representing the effect of said feedback means in varying said feedback signal; a second computing element constructed and arranged for having second and third input signals applied thereto and to produce in response to said second and third input signals a second output signal, the value of which is proportional to the product of the values of said second and third input signals, said first computing element being connected to said second commputing element so as to apply said first output signal to said second computing element as one of said second and third input signals; whereby the said second output signal is proportional to the value of the other of said second and third input signals multiplied by the value of said first output signal.

9. In combination, a first computing element adapted to produce a first output signal in response to and representative of a first input signal applied thereto, said computing element having a conductance defined by the ratio of the value of said first output signal to the value of said first input signal, feedback means for deriving from said first output signal a feedback signal that is proportional to the value of said first output signal, said feedback means being operable to vary the value of said feedback signal and said feedback means being arranged to oppose said feedback signal to said first input signal, whereby the value of said first output signal is proportional to the value of said first input signal divided by a factor representing the effect of said feedback means in varying said feedback signal; a second computing element constructed and arranged for having second and third input signals applied thereto and to produce in response to said second and third input signals a second output signal, the value of which is proportional to the product of the values of said second and third input signals, said first computing element being connected to said second computing element so as to apply said first output signal to said second computing element as one of said second and third input signals; whereby the said second output signal is proportional to the value of the other of said second and third input signals multiplied by the value of said first output signal; a third computing element constructed and arranged for having a fourth input signal applied thereto and to produce in response to said fourth input signal a third output signal of a value proportional to a root of the value of said fourth input signal, said second computing element being connected to said third computing element so as to apply said second output signal as said fourth input signal to said third computing element, whereby the value of said third output signal is proportional to the root of said second output signal.

10. A null-balance system including servo means responsive to the difference between a variable signal and a balancing signal to produce a position output in accordance with said difference; balancing signal producing means responsive to said position output to produce a change in said balancing signal of such nature as to tend to reduce said difference to zero, said balancing signal producing means being a multiplier having a balancing signal output and including first and second members movable to different positions, said multiplier being so constructed and arranged that said balancing signal is proportional to the product of the position of the said first member and the position of the said second member, said servo means being connected to said multiplier so that the said position output simultaneously changes both the position of said first member and the position of said second member, and an instrumentality automatically effective upon one of said members to restrict its total range of movement to a portion of the total range of movement of the other of said members, said multiplier being otherwise so constructed and arranged that simultaneous changes in position of the said members are in fixed linear proportion to one another.

11. The invention of claim 10 wherein said instrumentality includes stop means and escapement means, and wherein said first and second members are mechanically coupled together and to said position output, said stop means being arranged in the path of motion of said one of said members so as to be contacted thereby when said one of said members attains a given position, and to block said member from further movement; said escapement means forming part of the mechanical coupling between said members and being responsive to urging of said one of said members against said stop means to release the mechanical coupling between said members until and unless the said position output of said servo means becomes such as to cause said one of said members to retrace the path of movement by which it came into contact with said stop means.

12. The invention of claim 11 wherein said escapement means includes bias means resiliently urging said first and second members away from each other, and a pair of elements, one to a said member, said elements being interlocked with each other in such fashion as to permit a limited extent of movement between said members away from each other under the influence of said bias means; said position output being effectively coupled directly to said other of said members and effectively indirectly connected to said one of said members via said bias means; said stop means being so located as to block movement of said members upon movement of the last said member to a given position.

13. A square root extracting system comprising, in combination, a first voltage source having a first output voltage proportional to a value of which the square root is to be determined, a second voltage source, said second voltage source having a first positionable element and a current input, said second voltage source being so constructed and arranged as to produce a second output voltage proportional to the product of the position of said first positionable element and the value of current applied to said current input, a current source including a second positionable element, said current source being so constructed and arranged as to produce an output current proportional to the position of said second positionable element, said current source being connected to said second voltage source so as to apply said output current to said current input, and said first voltage source being connected to said second voltage source in such fashion as to oppose the said first and second output voltage; servo means having a position output, said servo means being responsive to difference between said first and second output voltages to cause the said position output to have a sense and magnitude in accordance with the sense and magnitude of the difference between said first and second output voltages, said first positionable element and said second positionable element each being connected to said position output in such manner that the latter positions each of the former in proportion to said position ouput and in a sense tending to reduce to zero said difference between said first and second output voltages, and means for disabling the connection between one of said positionable elements and said position output for position of said one of said positionable elements corresponding to values of the square root of said first output voltage below a given limit.

14. The invention of claim 13, wherein the last said means includes an escapement mechanism, and linkage connected to said one of said positionable elements and to said position output, said linkage being arranged to transmit said position output to said one of said positionable elements, and said escapement mechanism being arranged to disconnect said linkage from said one of said positionable elements when the position of said one of said positionable elements corresponds to values of the square root of said first output voltage less than a given value of said square root.

15. In combination, a first winding connected to a source of current, a second winding inductively coupled to said first winding, a first member movable to vary the coupling between said windings, a third winding, a fourth winding inductively coupled to said third winding, a second member movable to vary the coupling between said third and fourth windings, amplifying means connected to said second winding and to said third winding and constructed and arranged to energize said third winding by means of an amplified signal derived from said second winding; servo means responsive to an error signal to produce a position output; a linear-rotary cam and a follower therefor, said cam and said follower coupling said movable members to said position output for joint simultaneous movement of said members in accordance with said position output, whereby a signal is developed in said fourth winding in proportion to the product of the positions of said movable members, and means for deriving said error signal as the difference between last said signal and another signal, the arrangement being that a change in said error signal of a given sense causes said last said signal to change in a sense such as to oppose said error signal, and a pivoted lever linking said follower to said members, said lever being oriented so that said follower contacts the periphery of said cam at a point thereon at which the tangent to the periphery of the cam at that point is substantially parallel to the lever arm of said lever.

16. A null-balance system including servo means responsive to the difference between a variable signal and a balancing signal to produce a position output in accordance with said difference; balancing signal producing means responsive to said position output to produce a change in said balancing signal of such nature as to tend to reduce said difference to zero, said balancing signal producing means being a multiplier having a balancing signal output and including first and second members movable to different positions, said multiplier being so constructed and arranged that said balancing signal output is proportional to the product of the position of the said first member and the position of the said second member, said servo means being connected to said multiplier so that the said position output simultaneously changes both the position of said first member and the position of said second member, said multiplier being so constructed and arranged that simultaneous changes in position of the said members are in fixed linear proportion to one another, and said servo means being effectively responsive to the position of one of said members to vary its position output in accordance with said position of the said one of said members.

17. A servo system wherein two signals are differentially compared each with the other, said system comprising servo means for varying one of said signals in accordance with the results of such comparison such as to cause said one of said signals to balance the said other of said signals, said servo means including a first instrumentality operable to vary said one of said signals and a second instrumentality operable to vary said one of said signals, each of said instrumentalities being simultaneously and independently operable to vary the said one of said signals in a sense such as to balance said signals, whereby the extent of variation of said one of said signals required to balance said signals is a function of the extent to which said first instrummentality varies said one of said signals and of the extent to which said second instrumentality concurrently varies said one of said signals, means producing an output quantity representing the extent to which one of said instrumentalities varies said one of signals as said servo means balances the said signals, whereby said output quantity represents the value of a non-linear function of the said other of said signals, and means for causing said servo means to vary said one of said signals in inverse proportion to said output quantity.

18. A square root extracting system comprising, in combination, a first voltage source having a first output voltage proportional to a value of which the square root is to be determined, a second voltage source, said second voltage source having a first positionable element and a current input, said second voltage source being so constructed and arranged as to produce a second output voltage proportional to the product of the position of said first positionable element and the value of current applied to said current input, a current source including a second positionable element, said current source being so constructed and arranged as to produce an output current proportional to the position of said second positionable element, said current source being connected to said second voltage source so as to apply said output current to said current input, and said first voltage source being connected to said second voltage source in such fashion as to oppose the said first and second output voltages; servo means having a position output, said servo means being responsive to difference between said first and second output voltages to cause the said position output to have a sense and magnitude in accordance with the sense and magnitude of the difference between said first and second output voltages, said first positionable element and said second positionable element each being connected to said position output in such manner that the latter positions each of the former in proportion to said position output and in a sense tending to reduce to zero said difference between said first and second output voltages, and gain control means automatically operable in accordance with the position of one of said positionable elements to vary said position output in accordance with the last said position, whereby the said position output is representative of the square root of the value of said first output voltage.

19. The invention of claim 18, wherein said gain control means includes means for deriving an AGC signal from said current source, and said servo means includes means which determines the ratio between said difference and said position output, the last said means being responsive to said AGC signal to vary said ratio as a function of the current of said current source and inverse to said first output voltage.

20. The invention of claim 18, wherein said current source is provided with a current from a supply source, said current source being operable by said second positionable element to produce a third voltage in proportion to the product of the said second positionable element and the said current of said supply source, and is also provided with means for converting said third voltage to said output current; said first voltage source including means receiving the said current from said supply source and instrumentalities operative to cause said first output voltage to represent the product of said value and said current from said supply source, whereby the said current from said supply source is prevented from being a factor determining said position output of said positioning means.

21. In combination, first, second, third, fourth, fifth and sixth phase-inverting devices, each of the said devices being responsive to A.C. applied thereto to produce an A.C. signal substantially inverted in phase with respect to said A.C. applied thereto, and each of said first, third, fourth and sixth devices being responsive to a variable condition to cause the amplitude of said A.C. signal to vary directly in accordance with the value of said variable condition; said second device being of the type having a negative feedback loop and being responsive to A.C. applied thereto to produce an A.C. signal, a portion of which is fed back through said loop for determining the relation of the last said A.C. signal to said A.C. applied to said second device, said loop including substantially only ohmic impedance, said ohmic impedance being constructed and arranged to vary the amount of feedback through said loop inversely with respect to the value of a variable condition; supply means for applying A.C. of predetermined value to said first device, said first device being connected to apply its said A.C. signal to said second device, and said second device being connected to said fourth device to apply its said A.C. signal to said fourth device whereby the last said A.C. signal is representative of the product of the values of two variable conditions divided by the value of a third variable condition; error detecting means responsive to the difference between a pair of signals to produce an error signal proportional to the difference between said pair of signals; means for applying said A.C. of predetermined value to said fourth device; said fourth device being connected to said fifth device to apply its said A.C. signal to said fifth device, said fifth device being connected to said sixth device, to apply its said A.C. signal thereto; said sixth device being effectively connected to said third device to oppose its said A.C. signal to the said A.C. signal of the latter; said error detecting means being interconnected with said third and sixth devices such that the said A.C. signals of said third and sixth devices define said pair of signals; each of said fourth and sixth devices being individually and simultaneously responsive to said error signal as a said variable condition to produce their respective A.C. signals in the same sense with respect to variation in said error signal; whereby the said A.C. signal of said sixth device is to the said A.C. signal of said third device as the square root of the latter said A.C. signal is to said latter said A.C. signal but opposite in sense; and whereby variations in the said A.C. of said supply means are reflected equally and oppositely at all times in the said A.C. signals produced by said third and sixth devices.

22. The invention of claim 21 including means operative over a given portion of the range of the said A.C. signal produced by one of said fourth and fifth devices to prevent variation of the said A.C. signal produced by the other of said fourth and fifth devices within said given portion of said range.

23. The invention of claim 21 including means effectively responsive to the said A.C signal produced by said fourth device to produce an AGC signal representative of the last said A.C. signal, said error detecting means being responsive to said AGC signal to vary the said error signal inversely with respect to said AGC signal.

References Cited by the Examiner
UNITED STATES PATENTS

| 2,226,822 | 12/40 | Kirk et al. | 336—131 |
| 2,488,375 | 12/49 | Carlson | 336—131 |
| 2,535,257 | 12/50 | Berger | 328—144 |
| 2,657,580 | 11/53 | Schroeder | 73—362 |
| 2,702,857 | 2/55 | Berger et al. | 382—144 |
| 2,718,144 | 9/55 | Hornfeck | 73—205 |
| 2,938,385 | 5/60 | Mack et al. | 73—362 |
| 2,954,692 | 10/60 | Hornfeck | 73—205 |

MALCOLM A. MORRISON, *Primary Examiner.*

WALTER W. BURNS, JR., *Examiner.*